(12) United States Patent
Abdesselam (10) Patent No.: US 11,456,591 B2
(45) Date of Patent: Sep. 27, 2022

(54) DEVICE FOR EMULATING A BIMETALLIC STRIP, AND DEVICE FOR PROTECTING AN ELECTRICAL LINE FROM OVER-CURRENTS

(71) Applicant: THALES, Courbevoie (FR)

(72) Inventor: Francis Abdesselam, Chatou (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 17/258,737

(22) PCT Filed: Jul. 17, 2019

(86) PCT No.: PCT/EP2019/069203
§ 371 (c)(1),
(2) Date: Jan. 7, 2021

(87) PCT Pub. No.: WO2020/016277
PCT Pub. Date: Jan. 23, 2020

(65) Prior Publication Data
US 2021/0273444 A1    Sep. 2, 2021

(30) Foreign Application Priority Data

Jul. 19, 2018  (FR) ....................... 1800779

(51) Int. Cl.
*H02H 6/00*     (2006.01)
*H02H 3/08*     (2006.01)
*H02H 7/22*     (2006.01)

(52) U.S. Cl.
CPC .............. *H02H 6/00* (2013.01); *H02H 3/085* (2013.01); *H02H 7/228* (2013.01)

(58) Field of Classification Search
CPC ............ H02H 6/00; H02H 6/005; H02H 5/04; H02H 5/041; H02H 3/08; H02H 3/087
See application file for complete search history.

(56) References Cited

U.S. PATENT DOCUMENTS

| 3,697,813 A | 10/1972 | Fox |
| 5,854,731 A * | 12/1998 | Thomas ............... H02H 3/0935 361/103 |
| 2007/0014066 A1 | 1/2007 | Ye |
| 2007/0165349 A1* | 7/2007 | Parker .................. H02H 1/0015 361/103 |
| 2008/0285197 A1* | 11/2008 | Nakamura ............. H02H 6/005 361/93.8 |

FOREIGN PATENT DOCUMENTS

| JP | 2005-295738 A | 10/2005 |
| WO | 97/04511 A1 | 2/1997 |

* cited by examiner

*Primary Examiner* — Jared Fureman
*Assistant Examiner* — Christopher J Clark
(74) *Attorney, Agent, or Firm* — BakerHostetler (57) ABSTRACT

An emulating device for emulating a bimetallic strip, the emulating device comprising a current sensor capable of measuring a line current ($I_P$) flowing through the emulating device, the emulating device being capable of providing a value representative of a cumulative thermal state over time t, which value is referred to as cumulative thermal state, by recursively adding a value representative of an initial thermal state, which value is referred to as initial thermal state, and a value representative of a present thermal state, which value is referred to as present thermal state, which is determined on the basis of the line current ($I_P$).

11 Claims, 4 Drawing Sheets

DEVICE FOR EMULATING A BIMETALLIC STRIP, AND DEVICE FOR PROTECTING AN ELECTRICAL LINE FROM OVER-CURRENTS

CROSS-REFERENCE TO RELATED APPLICATIONS

This application is a National Stage of International patent application PCT/EP2019/069203, filed on Jul. 17, 2019, which claims priority to foreign French patent application No. FR 1800779, filed on Jul. 19, 2018, the disclosures of which are incorporated by reference in their entirety.

FIELD OF THE INVENTION

The invention relates to a device for providing thermal protection for an electrical line. It applies in particular, but in a nonlimiting way, to the field of aeronautics, and more precisely to the thermal protection of cables that can supply power to an auxiliary power unit (used during taxiing phases of an aircraft, for example).

BACKGROUND

Electrical lines are subject to heating mainly due to the flow of the current. The heating can cause damage to the electrical line, for example softening of the plastic surrounding the electrical cable, or even the emission of smoke in the case of intense overheating. It is necessary to provide means for disconnecting the electrical lines in the event of overheating in order to protect them. The protection can extend to an electrical circuit connected to the electrical line, such as generators, electrical lines for distributing power produced by the generators and loads to which the lines supply power. Loads can be of several types: mainly resistive loads, for example implemented in avionics for heating or deicing, and mainly inductive loads, for example formed by the coils of rotating machines.

It is possible for example to protect a line against over-currents by means of a fuse, the role of which is to disconnect the electrical line when the electrical current flowing through the line exceeds a given level for a given time. Fuses can be delayed, in particular to allow large currents to pass for short periods. This is necessary in particular when starting electrical machines, where a high-intensity current may be required. Fuse protection is not very precise and requires the fuse to be changed when it has interrupted the current. Fuses are mainly used to compensate for serious faults of short-circuit type.

To avoid having to change fuses, thermal cut-outs can be implemented. Thermal cut-outs are generally equipped with a bimetallic strip formed by a composite bar comprising two materials having different coefficients of thermal expansion. When an excessive current passes through the bimetallic strip, the latter deforms as a result of the Joule effect, causing mechanical opening of the line. Compared to fuses, thermal cut-outs have the advantage of not needing to be changed in the event of tripping. Using the Joule effect to open the line tends to delay tripping.

However, as with fuses, the protection is not very precise. Moreover, cut-outs with a bimetallic strip have a fairly short life. Typically, such a cut-out supports fewer than 4000 operations. Moreover, a thermal cut-out cannot be reset remotely and therefore requires manual intervention.

SUMMARY OF THE INVENTION

The invention aims to compensate for all or some of the aforementioned problems by proposing a circuit that operates in the manner of a bimetallic strip and that has increased life.

A subject of the invention is therefore an emulating device for emulating a bimetallic strip, the emulating device comprising a current sensor capable of measuring a line current flowing through the emulating device, the emulating device being capable of providing a value representative of a cumulative thermal state over time t, which value is referred to as cumulative thermal state, by recursively adding a value representative of an initial thermal state, which value is referred to as initial thermal state, and a value representative of a present thermal state, which value is referred to as present thermal state, which is determined on the basis of the line current.

Advantageously, the emulating device comprises a squaring operator configured to square a value representative of the line current, which value is output by the current sensor.

According to a first embodiment, the emulating device comprises a programmable digital component configured to calculate the present thermal state by means of the relationship:

$$E_{th\_on} = \frac{I_P^2}{I_{th}^2} \times (1 - e^{\frac{-t}{\tau}})$$

where $E_{th\_on}$ is the value of the present thermal state when the emulating device is supplied with the line current, where $I_P$ is the value representative of the line current, $\tau$ is a time constant and $I_{th}$ is a conventional thermal current of the emulated bimetallic strip, and by means of the relationship:

$$E_{th\_off} = \frac{I_P^2}{I_{th}^2} \times 1 - e^{\frac{-t}{\tau}}$$

where $E_{th\_off}$ is the value of the present thermal state when the emulating device is not supplied with the line current, where $I_P$ is the value representative of the line current at the instant at which the emulating device is no longer supplied with current, $\tau$ is a time constant and $I_{th}$ is a conventional thermal current of the emulated bimetallic strip.

Advantageously, the emulating device comprises a counter configured to determine the time since the instant at which the emulating device is no longer supplied with current.

Advantageously, the programmable digital component is of FPGA type.

According to a second embodiment, the value representative of the line current is an image voltage corresponding to the line current, the emulating device comprising at least one series RC circuit, and comprising at least one capacitor, at the terminals of which the cumulative thermal state is measured, the series RC circuit being connected to the squaring operator, the initial thermal state being determined by the initial state of charge of the capacitor at the end of a charging or discharging cycle, the present thermal state being determined by the evolution of the state of charge of the capacitor.

Advantageously, the squaring operator comprises:

a comparator configured to compare the image voltage with a ramp signal and to reset the periodic ramp signal as soon as it is equal to the image voltage, thus generating a variable period ramp signal having, for each variable period, a maximum amplitude equal to the image voltage at the same instant;

an integrator connected to the output of the comparator and configured to integrate each ramp of the variable period ramp signal over a duration equal to the variable period, thus generating an integrated ramp signal, and to provide the RC circuit with the integrated ramp signal.

Advantageously, the emulating device comprises a DC current source capable of supplying a ramp capacitor with a DC ramp current, the emulating device being capable of resetting the ramp signal by means of a controlled discharging of the ramp capacitor.

Advantageously, the emulating device comprises an envelope detection circuit arranged between the squaring operator and the series RC circuit.

Advantageously, the emulating device comprises: a comparison device for comparing the image voltage with a reference voltage, the comparison device being capable of providing a difference signal representing the difference between the image voltage and the reference voltage; and a first voltage divider coupled to a first switch controlled by the difference signal, the first voltage divider being configured so as, when the difference signal is positive, to divide the image voltage by a predetermined coefficient of reduction.

Advantageously, the emulating device comprises a second voltage divider coupled to a second switch controlled by the difference signal, the second voltage divider being configured so as, when the difference signal is negative, to divide the voltage of the signal provided to the series RC circuit by the square of the predetermined coefficient of reduction.

The invention also relates to a protective device for protecting an electrical line from overcurrents of the line current, the protective device comprising:

an aforementioned emulating device;
a state comparator configured to compare the cumulative thermal state with a target value;
a changeover device configured to disconnect the electrical line if the cumulative thermal state exceeds the target value.

BRIEF DESCRIPTION OF THE DRAWINGS

Other features, details and advantages of the invention will emerge on reading the description provided with reference to the appended drawings, which are given by way of example and in which, respectively.

DETAILED DESCRIPTION

The invention aims to emulate a bimetallic strip by using an emulating device that reproduces the behavior of a bimetallic strip as faithfully as possible. The bimetallic strip to be emulated is characterized by a trip curve. The trip curve illustrates, for a given time, the maximum continuous current that the bimetallic strip can take before opening, for example in order to trigger protection of a line or of a load to be protected. The line is sized on the basis of the load to be protected (object for protection). The protection of the line is therefore similar to the protection of the load. Maximum continuous current is understood to mean either a DC current or an AC current. In the case of an AC current, the value of the maximum continuous current corresponds to the rms value.

Figure 1:
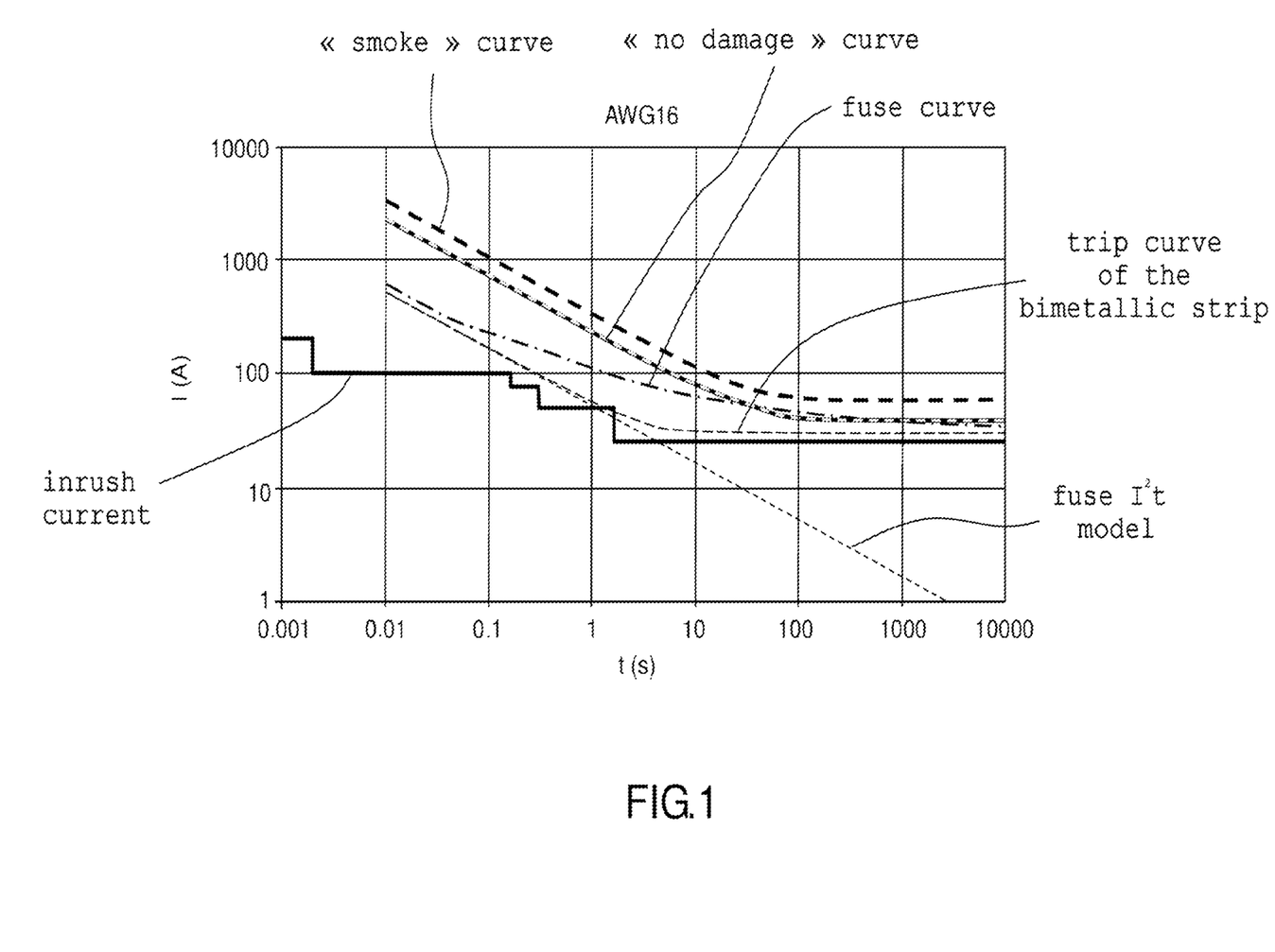
FIG. 1 shows an illustration of the selective levels associated with the thermal protection of a 25 Arms line, for an aeronautical application.

FIG. 1 illustrates the selective levels associated with the thermal protection of a copper line of AWG16 type. Such a line has a diameter, in a standardized manner, of 1.29 millimeters. This type of line is commonly used in the aeronautical field to carry a current to a load, for example an electric motor. It is, of course, understood that the invention can be implemented whatever the cross section of the line and whatever its material, since it is capable of conducting an electric current. The load takes up an inrush current. In FIG. 1, the inrush current of the load has a value estimated at 25 Arms for an infinite time. For an infinite time, the trip curve exhibits the conventional thermal current $I_{th}$ of the emulated bimetallic strip. This is the maximum current that the copper line can carry continuously without excessive heating.

The trip curve of the bimetallic strip must therefore be above the curve representing the inrush current. The conventional thermal current $I_{th}$ must be above the value of the inrush current (for an infinite time: 30 Arms in the example of FIG. 1). Protection redundancy may also be implemented using a fuse, in case of failure of the bimetallic strip. The blow curve of the fuse is therefore slightly above the trip curve of the bimetallic strip. In this instance, the infinite value of the blow curve of the fuse is 35 Arms. FIG. 1 also shows a curve referred to as «no damage» and a «smoke» curve, which are characteristic of the line to be protected. It likewise shows the model referred to as «$i^2 t$» for a fuse, namely modeling of the product of the square of the current and time.

The trip curve of the bimetallic strip can be modeled by means of the relationship referred to as the bimetallic strip relationship:

$$I_P = \frac{I_{th}}{\sqrt{1 - e^{-t/\tau}}}$$

$I_P$ is the line current of the line to be protected, and for example measured by a current sensor.

$\tau$ is a time constant predetermined on the basis of the inrush current imposed by the load, in particular in the initial current surge phase, which corresponds to the product of the thermal resistance of the component to be protected and the thermal capacitance of the component to be protected.

From the above relationship, it can be deduced that:

$$\frac{I_P^2}{I_{th}^2} \times (1 - e^{\frac{-t}{\tau}}) = 1$$

A thermal state $E_{th\_on}$ is defined by means of the following relationship:

$$E_{th\_on} = \frac{I_P^2}{I_{th}^2} \times (1 - e^{\frac{-t}{\tau}}) \quad (1)$$

If the thermal state $E_{th\_on}$ is greater than 1, it can be deduced from the two relationships above that the measured line current $I_P$ exceeds the trip curve. On the other hand, if the thermal state $E_{th\_on}$ is less than 1, the measured current $I_P$ is below the trip curve.

In the absence of a line current IP, the thermal state is defined by means of the following relationship:

$$E_{th\_off} = \frac{I_P^2}{I_{th}^2} \times e^{\frac{-t}{\tau}} \quad (2)$$

In this case, in relationship (2), $I_P$ is the value representative of the line current at the instant at which the emulating device EMU is no longer supplied with current, namely just before a power-down.

Relationships (1) and (2) allow a normalized thermal state to be obtained (between 0 and 1), at a given instant, which is easily exploitable. The conventional thermal current $I_{th}$ corresponds to the maximum current that the load (or the line, the protection of which is similar to the load) can carry continuously, namely when t→∞.

It is therefore possible to define a cumulative thermal state $E_{th\_n}$, which corresponds to the cumulative thermal state of the emulated bimetallic strip over time.

The cumulative thermal state $E_{th\_n}$ is obtained by taking account of a present thermal state (which may be the thermal state $E_{th\_on}$ when the emulating device EMU is supplied with current or the thermal state $E_{th\_off}$ when the emulating device EMU is not supplied with current) and an initial thermal state $E_{th\_i}$.

By way of example, when an electric motor is initially powered up, a line current $I_P$ having a particularly high value can be measured (so-called transient state). The value of the line current $I_P$ can then fall (so-called steady state). During the transient state, the value of the cumulative thermal state $E_{th\_n}$ is obtained by adding the value of the initial thermal state $E_{th\_i}$, which may possibly be zero, to the value of the present thermal state $E_{th\_on}$ when the emulating device EMU is supplied with current.

During the steady state, the value of the cumulative thermal state $E_{th\_n}$ is obtained by adding the value of the initial thermal state $E_{th\_i}$, which is equal to the value of the cumulative thermal state $E_{th\_n}$ at the end of the transient state, to the value of the present thermal state $E_{th\_on}$ when the emulating device EMU is supplied with current. The value of the line current $I_P$ is lower for the steady state than for the transient state in this case.

Figure 2:
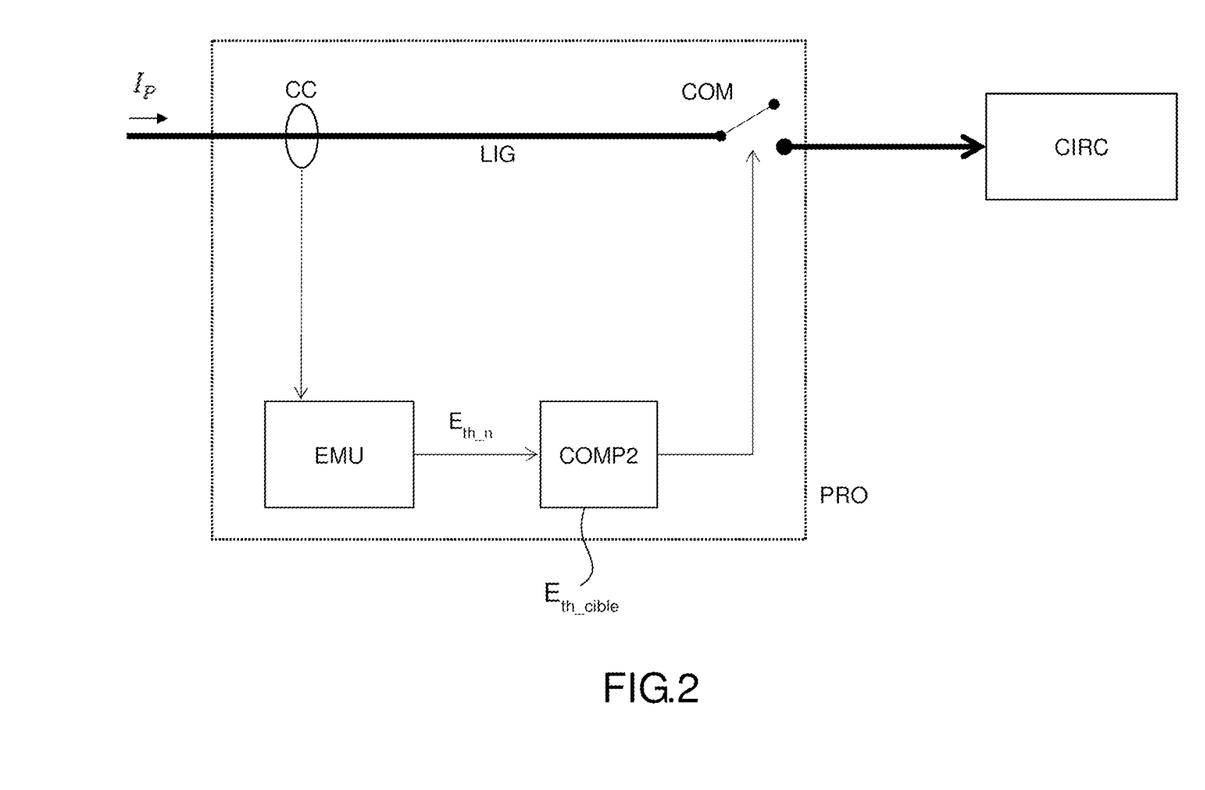
FIG. 2 shows a block diagram of the protective device according to the invention.

FIG. 2 illustrates a block diagram of a protective device PRO incorporating an emulating device EMU according to the invention. The electrical line LIG to be protected can be connected to an electrical circuit CIRC. The value of the cumulative thermal state $E_{th\_n}$ is calculated by the emulating device EMU from the line current $I_P$ measured by the current sensor CC. A state comparator COMP2 compares the cumulative thermal state $E_{th\_n}$ with a target value $E_{th\_cible}$. The target value $E_{th\_cible}$ can be defined manually on the basis of the electrical line LIG to be protected from a potential overcurrent. The protective device PRO also comprises a changeover device COM, which disconnects the line LIG if the state comparator COMP2 detects that the value of the cumulative thermal state $E_{th\_n}$ is greater than the target value $E_{th\_cible}$. The changeover device COM can take the form of a switch controlled by the output of the state comparator COMP2. The changeover device COM is on as long as the value of the cumulative thermal state $E_{th\_n}$ is less than the target value $E_{th\_cible}$, and off in the opposite case.

In an implementation example of the invention, the emulated bimetallic strip is subject to periods in which it is supplied with current (heating periods) alternating with periods in which it is not supplied with current (cooling periods). It is therefore possible to recursively define the value of the cumulative thermal state $E_{th\_n}$ in the $n^{th}$ period.

As calculating an exponential is particularly complex in digital, it is possible to perform, for an implementation in a digital circuit, a calculation approximation for a time t that is short compared to the time constant c:

$$1 - e^{\frac{-t}{\tau}} \cong \frac{t}{\tau} \text{ and } e^{\frac{-t}{\tau}} \cong 1 - \frac{t}{\tau}$$

Thus, for an $n^{th}$ period, the value of the cumulative thermal state $E_{th\_n}$ is determined recursively according to the following relationship:

$$E_{th\_n} = E_{th\_off\_n-1} + E_{th\_on\_n} = \frac{I_{P_{n-1}}^2}{I_{th}^2} \times \left(1 - \frac{T_1}{\tau}\right) + \frac{I_{P_n}^2}{I_{th}^2} \times \left(\frac{T_2}{\tau}\right)$$

$E_{th\_off\_n-1}$ is the value of the thermal state at the end of the preceding power-down period $T_1$. $E_{th\_on\_n}$ is the value of the thermal state at the end of the present power-up period $T_2$. The power-down $T_1$ and power-up $T_2$ periods can have different durations or may be the same for an AC input signal. $I_{P_{n-1}}$ is the value of the line current just before power-down and $I_{P_n}$ is the value of the line current during power-up. Value of the current is understood to mean the rms value of the current. In particular, for an AC input signal, the value of the line current $I_{P_{n-1}}$ during power-down and the value of the line current $I_{P_n}$ during power-up are the same.

According to a first embodiment, the aforementioned recursive relationship can advantageously be implemented in a programmable digital circuit, for example an FPGA (field-programmable gate array) circuit, an ASIC (application-specific integrated circuit) circuit or else a microcontroller.

According to this embodiment, the emulating device EMU, implemented in a programmable digital circuit, comprises a squaring operator. The operator is digitally programmed to square a value representative of the line current $I_P$ output by the current sensor CC, in accordance with relationships (1) and (2). The operator may be programmed to raise the value representative of the line current $I_P$ to a power substantially different than 2.

When the emulating device is not supplied with current (source powered down), it is advisable to equip the programmable digital circuit with a counter. The reason is that when the programmable digital circuit is not supplied with current, the counter allows the period of absence of line current to be recorded. This period can then be used to determine the initial thermal state $E_{th\_i}$.

The invention can also, according to a second embodiment, be implemented in an analog circuit. This embodiment does not call for digital components of DSP, ASIC or FPGA type and therefore does not have to meet the high demands of RTCA standard DO-254 concerning digital components aboard aircraft. For that purpose, relationships (1) and (2) defined above are used. The proposed circuit implements the function for squaring the line current $I_P$, along with the functions $(1-e^{-t/\tau})$ and $(e^{-t/\tau})$, implemented for power-up periods and power-down periods of the emulated bimetallic strip, respectively, in analog fashion.

Figure 3:
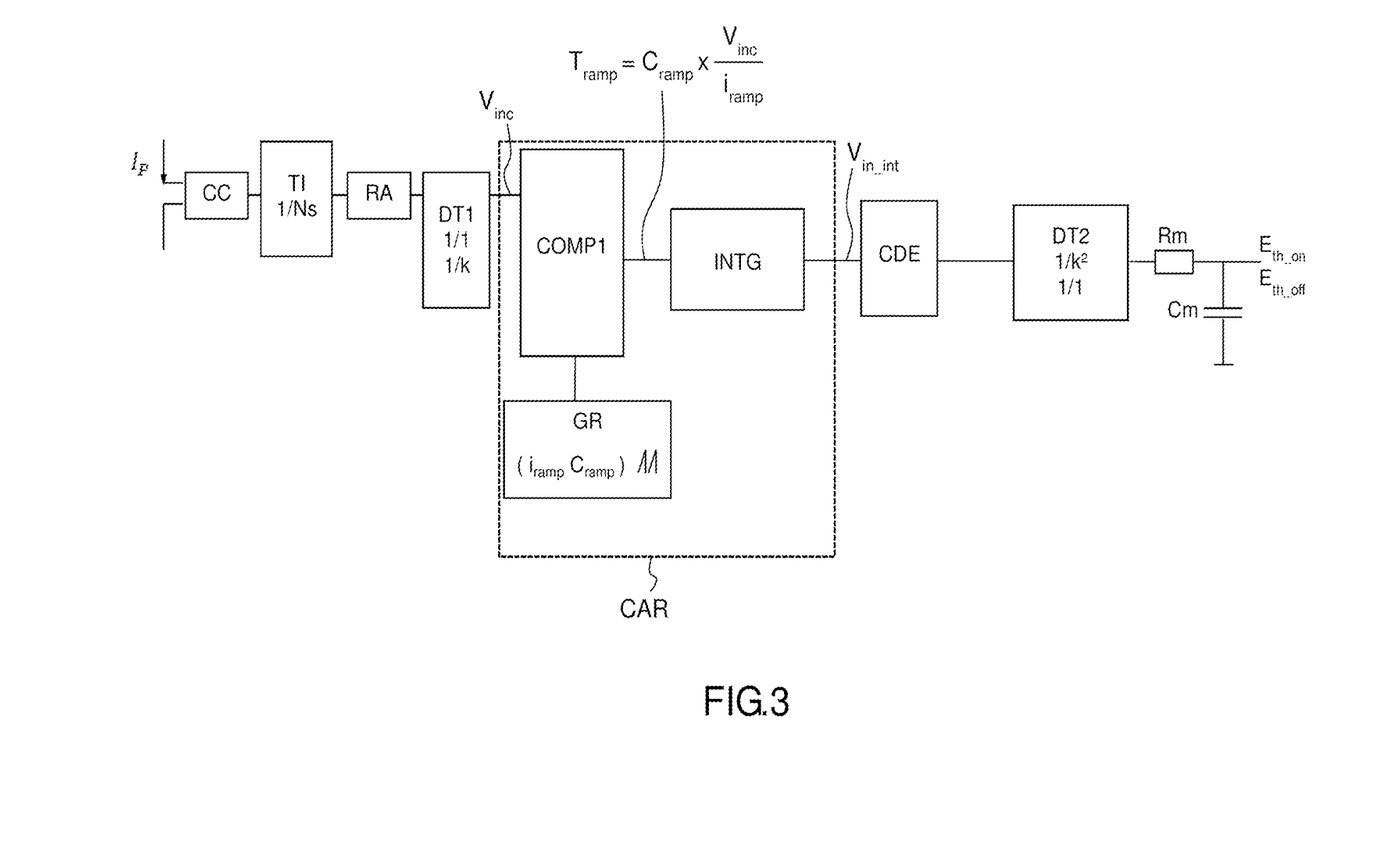
FIG. 3 shows a block diagram of the emulating device according to an embodiment referred to as «analog».
Figure 4:
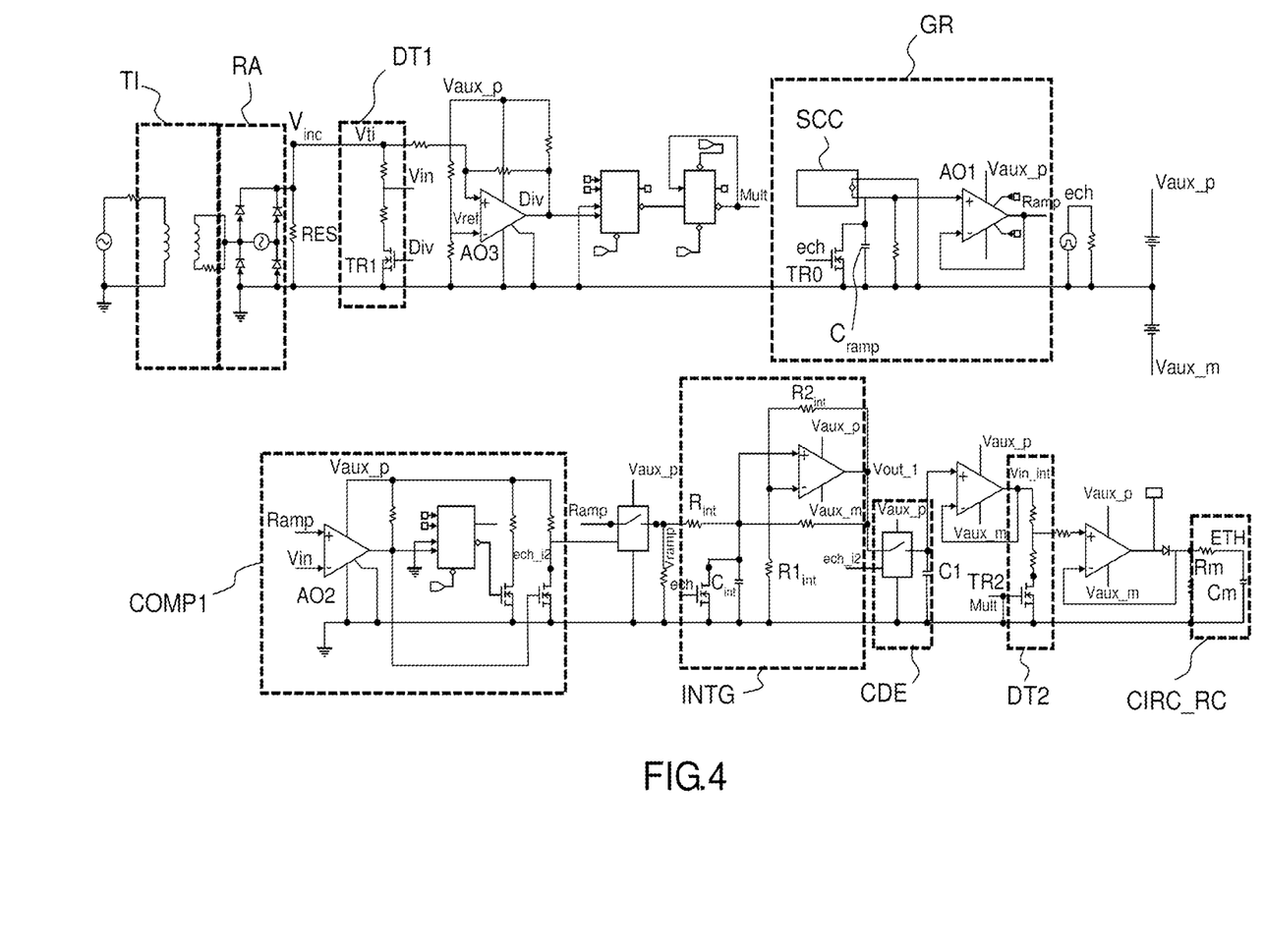
FIG. 4 shows a diagram of the various analog components of the emulating device according to the invention.

FIG. 3 illustrates the analog circuit according to the invention using a function block diagram. In parallel with this block diagram, FIG. 4 shows the components used in detail in nonlimiting fashion. The line current $I_P$, provided by the current sensor CC, is transmitted to a current transformer TI in order to divide the value of the current by a predetermined factor Ns. This lowering of the current allows components capable of processing smaller currents to be used in the analog circuit. By way of example, the current transformer TI can be configured to change a current in the order of around one hundred or even one thousand amps to a current in the order of one amp by applying the desired ratio to the number of turns of the primary in relation to the number of turns of the secondary.

The negative half-cycles of the lowered line current $I_P$ are then rectified using a full-wave rectifier RA. The full-wave rectifier can be designed for example according to a diode bridge circuit, as illustrated in FIG. 4. The output of the full-wave rectifier RA is therefore the absolute value of the signal output by the current transformer TI.

A resistor RES, illustrated in FIG. 4, is connected to the output of the full-wave rectifier RA. Thus, the value representative of the line current $I_P$ is a voltage corresponding to the line current $I_P$, subsequently called image voltage $V_{inc}$.

According to relationships (1) and (2), a squaring of the value of the line current $I_P$ needs to be performed. In order to effect such squaring of the value of the line current $I_P$ it is possible to use a multiplier that multiplies the value of the line current $I_P$ by itself. However, analog multipliers are complex devices.

The squaring can also be calculated by way of calculation of an integral. The integral is calculated for a ramp signal, which is produced by a ramp generator GR. A ramp signal is generated by a charging of a ramp capacitor $C_{ramp}$, which is shown in FIG. 4. The ramp capacitor $C_{ramp}$ is supplied with a DC ramp current $i_{ramp}$, which is generated by a DC current source SCC. An operational amplifier AO1 connected in follower configuration can be coupled to the ramp capacitor $C_{ramp}$ and to the DC current source SCC in order to perform impedance matching with the next stage. The input of a comparator COMP1 receives the image voltage $V_{inc}$ and the ramp signal. The comparator COMP1 can take the form of an operational amplifier AO2 that determines the difference between the image voltage $V_{inc}$ and the ramp signal, as illustrated in FIG. 4. The difference is compared with a zero reference voltage. From the relationship that is characteristic of the capacitor it is possible to establish the following relationship when the image voltage $V_{inc}$ and the ramp signal have the same amplitude:

$$t_{ramp} = C_{ramp} \times \frac{V_{inc}}{i_{ramp}} \quad (3)$$

At the instant at which the image voltage $V_{inc}$ and the ramp signal have the same amplitude, the comparator COMP1 controls the discharging of the ramp capacitor $C_{ramp}$. A transistor TR0, which is itself coupled to the comparator COMP1, can be placed in parallel with the ramp capacitor $C_{ramp}$ in order to control the discharging of the ramp capacitor $C_{ramp}$. Once discharged, the ramp capacitor $C_{ramp}$ recharges again until the image voltage $V_{inc}$ and the ramp signal have the same amplitude again.

The output of the comparator COMP1 is therefore a variable period ramp signal $t_{ramp}$ having, for each variable period $t_{ramp}$, a maximum amplitude equal to the image voltage $V_{inc}$ at the same instant. The variable period ramp signal $t_{ramp}$ then passes through an integrator INTG. The integrator INTG, which is shown in detail in FIG. 4, is characterized by a resistor $R_{int}$ and by a capacitor $C_{int}$ at the noninverting input, along with two resistors $R1_{int}$ and $R2_{int}$ at the inverting input. The integrator INTG determines an integrator output voltage $V_{in\_int}$:

$$V_{in\_int} = \frac{i_{ramp}\left(\frac{R2_{int}}{R1_{int}} + 1\right)}{C_{int}C_{ramp}R_{int}} \times \int_0^{t_{ramp}} t\,dt$$

$$V_{in\_int} = \frac{i_{ramp}t_{ramp}^2\left(\frac{R2_{int}}{R1_{int}} + 1\right)}{2C_{int}C_{ramp}R_{int}}$$

Thus, from relationship (3):

$$V_{in\_int} = k_1 V_{inc}^2 = k_2 I_P^2$$

where $k_1$ and $k_2$ are proportionality constants.

The squaring operator CAR, which is made up of the comparator COMP1 and the integrator INTG, thus allows a square of the value representative of the line current $I_P$ to be obtained.

An envelope detection circuit CDE is coupled to the squaring operator CAR in order to recover the envelope of the squared signal. Various types of envelope detection circuits can be used, in particular a peak detection circuit. Advantageously, the envelope detection circuit CDE is a sample and hold circuit. It comprises a switch and a capacitor C1. The switch is controlled by a sampling signal ech_i2, as illustrated in FIG. 4. As long as the switch is closed, the capacitor acts as a storage element for the signal output by the integrator INTG. When the switch receives an opening pulse, the capacitor, isolated from the signal output by the integrator INTG, returns the stored value. Advantageously, the sampling signal is fixed by the comparator COMP1. It transmits the opening pulse each time the image voltage $V_{inc}$ and the ramp signal have the same amplitude. Thus, the sample and hold circuit recovers, for each variable period $t_{ramp}$, the maximum of the variable period ramp signal, with a constant output between each opening control. An envelope substantially equal to the square of the image voltage can thus be recovered.

The value of the cumulative thermal state $E_{th\_n}$ is measured at the terminals of the capacitor of a series RC circuit CIRC_RC. The series RC circuit CIRC_RC comprises a resistor Rm, which is connected directly or indirectly to the envelope detection circuit CDE, and a capacitor Cm, at the terminals of which the value of the cumulative thermal state $E_{th\_n}$ is measured. The charging of the capacitor Cm emulates the behavior of a bimetallic strip during heating phases. The series RC circuit CIRC_RC thus performs the function $(1-e^{-t/\tau})$, which is described in relationship (1). The discharging of the capacitor Cm emulates the behavior of a bimetallic strip during cooling phases. The RC series circuit CIRC_RC thus performs the function $(1-e^{-t/\tau})$, which is described in relationship (2). It should be noted that:

$$\tau = Rm \times Cm$$

The time constant c can be found in the relationship for the bimetallic strip. The choice of numerical values for the resistor Rm and the capacitor Cm therefore determines the appearance of the trip curve of the bimetallic strip, which preferably needs to be above the curve of inrush current imposed by the load.

The aforementioned emulating device is configured to work with a line current $I_P$ having a wide dynamic range. The value of the line current $I_P$ can in particular change from a nominal current value $I_n$, which corresponds to the maximum value of the inrush current (200 Arms in the example in FIG. 1), to a value ten times smaller in the steady state. Equally, the value of the line current $I_P$ can greatly exceed the nominal current value $I_n$, for example when an electric motor starts up. The value of the line current $I_P$ may occasionally be ten times smaller than the nominal current value $I_n$, and occasionally ten times greater. This high dynamic range can bring about a loss of accuracy for determining the cumulative thermal state $E_{th\_n}$.

Thus, for a line current $I_P$ having a greater value than the value of the nominal current $I_n$, the image voltage $V_{inc}$, corresponding to the line current $I_P$ is divided by a predetermined coefficient of reduction k. For that purpose, a first voltage divider DT1 is connected to the resistor RES. The first voltage divider DT1 may be of resistive type. In FIG. 4, a first controlled switch TR1 is on when the image voltage $V_{inc}$ is detected as being above a threshold voltage $V_{ref}$. The threshold voltage $V_{ref}$ is determined on the basis of the nominal current value $I_n$. In this case, a fraction of the signal output by the resistor RES is taken from the terminals of the resistor having the lowest value. Detection of the threshold voltage $V_{ref}$ being exceeded can be performed by a comparator AO3. The comparator AO3 provides a difference signal Div representing the difference between the image voltage $V_{inc}$ and the reference voltage $V_{ref}$.

When the comparator AO3 does not detect the threshold voltage $V_{ref}$ being exceeded, the voltage output by the envelope detector circuit CDE is divided by the coefficient $k^2$, and the image voltage $V_{inc}$ corresponding to the line current $I_P$ is not divided by the coefficient of reduction k. For that purpose, a second voltage divider DT2 is connected between the envelope detector circuit CDE and the series RC circuit CIRC_RC. A second controlled switch TR2 is on when the image voltage $V_{inc}$ is detected as being below the threshold voltage $V_{ref}$, namely when the difference signal Div is negative.

Other embodiments may be envisaged in order to take account of the wide dynamic range of the line current $I_P$. By way of example, a high threshold (for example much higher than the nominal current $I_n$) and a low threshold (for example much lower than the nominal current $I_n$) may be defined. In this case, the coefficient of reduction k is applied to the image voltage $V_{inc}$ only if the line current is above the high threshold, and the coefficient of reduction $k^2$ is applied to the output of the envelope detector circuit CDE only if the line current is below the low threshold.

The invention claimed is:

1. An emulating device (EMU) for emulating a bimetallic strip, the emulating device (EMU) comprising a current sensor (CC) capable of measuring a line current ($I_P$) flowing through the emulating device (EMU), the emulating device (EMU) being capable of providing a value representative of a cumulative thermal state ($E_{th\_n}$) over time t, which value is referred to as cumulative thermal state ($E_{th\_n}$), by recursively adding a value representative of an initial thermal state ($E_{th\_i}$), which value is referred to as initial thermal state ($E_{th\_i}$), and a value representative of a present thermal state ($E_{th\_on}$, $E_{th\_off}$), which value is referred to as present thermal state ($E_{th\_on}$, $E_{th\_off}$), which is determined on the basis of the line current ($I_P$) said emulating device (EMU) comprising a squaring operator (CAR) configured to square a value representative of the line current ($I_P$), which value is output by the current sensor (CC), the value representative of the line current ($I_P$) being an image voltage (Vinc) corresponding to the line current ($I_P$), the emulating device (EMU) comprising at least one series RC circuit (CIRC_RC), and comprising at least one capacitor (Cm), at the terminals of which the cumulative thermal state ($E_{th\_n}$) is measured, the series RC circuit (CIRC_RC) being connected to the squaring operator (CAR), the initial thermal state ($E_{th\_i}$) being determined by the initial state of charge of the capacitor (Cm) at the end of a charging or discharging cycle, the present thermal state ($E_{th\_on}$, $E_{th\_off}$) being determined by the evolution of the state of charge of the capacitor (Cm).

2. The emulating device as claimed in claim 1, the squaring operator (CAR) comprising:
 a comparator (COMP1) configured to compare the image voltage (Vinc) with a ramp signal and to reset the periodic ramp signal as soon as it is equal to the image voltage (Vinc), thus generating a variable period ramp signal ($t_{ramp}$) having, for each variable period ($t_{ramp}$), a maximum amplitude equal to the image voltage (Vinc) at the same instant;
 an integrator (INTG) connected to the output of the comparator (COMP1) and configured to integrate each ramp of the variable period ramp signal over a duration equal to the variable period ($t_{ramp}$), thus generating an integrated ramp signal, and to provide the RC circuit with the integrated ramp signal.

3. The emulating device as claimed in claim 2, comprising a DC current source (SCC) capable of supplying a ramp capacitor ($C_{ramp}$) with a DC ramp current ($i_{ramp}$), the emulating device (EMU) being capable of resetting the ramp signal by means of a controlled discharging of the ramp capacitor ($C_{ramp}$).

4. The emulating device as claimed in claim 1, comprising an envelope detection circuit (CDE) arranged between the squaring operator (CAR) and the series RC circuit (CIRC_RC).

5. The emulating device as claimed in claim 1 comprising:
 a comparison device (AO3) for comparing the image voltage (Vinc) with a reference voltage (Vref), the comparison device (AO3) being capable of providing a difference signal (Div) representing the difference between the image voltage (Vinc) and the reference voltage (Vref); and
 a first voltage divider (DT1) coupled to a first switch (TR1) controlled by the difference signal (Div), the first voltage divider (DT1) being configured so as, when the difference signal (Div) is positive, to divide the image voltage (Vinc) by a predetermined coefficient of reduction (k).

6. The emulating device as claimed in claim 5, comprising a second voltage divider (DT2) coupled to a second switch (TR2) controlled by the difference signal (Div), the second voltage divider (DT2) being configured so as, when the difference signal (Div) is negative, to divide the voltage of the signal provided to the series RC circuit by the square of the predetermined coefficient of reduction (k).

7. A protective device (PRO) for protecting an electrical line (LIG) from overcurrents of the line current ($I_P$), wherein the protective device (PRO) comprises:
   the emulating device (EMU) of claim 1;
   a state comparator (COMP2) configured to compare the cumulative thermal state ($E_{th\_n}$) with a target value ($E_{th\_cible}$); and
   a changeover device (COM) configured to disconnect the electrical line (LIG) if the cumulative thermal state ($E_{th\_n}$) exceeds the target value.

8. An emulating device (EMU) for emulating a bimetallic strip, the emulating device (EMU) comprising a current sensor (CC) capable of measuring a line current ($I_P$) flowing through the emulating device (EMU), the emulating device (EMU) being capable of providing a value representative of a cumulative thermal state ($E_{th\_n}$) over time t, which value is referred to as cumulative thermal state ($E_{th\_n}$), by recursively adding a value representative of an initial thermal state ($E_{th\_i}$), which value is referred to as initial thermal state ($E_{th\_i}$), and a value representative of a present thermal state ($E_{th\_on}$, $E_{th\_off}$), which value is referred to as present thermal state ($E_{th\_on}$, $E_{th\_off}$), which is determined on the basis of the line current ($I_P$), said emulating device (EMU) comprising a squaring operator (CAR) configured to square a value representative of the line current ($I_P$), which value is output by the current sensor (CC), said emulating device (EMU) comprising a programmable digital component configured to calculate the present thermal state ($E_{th\_on}$, $E_{th\_off}$) by means of the relationship:

$$E_{th\_on} = \frac{I_P^2}{I_{th}^2} \times (1 - e^{\frac{-t}{\tau}})$$

where $E_{th\_on}$ is the value of the present thermal state when the emulating device (EMU) is supplied with the line current ($I_P$), where $I_P$ is the value representative of the line current ($I_P$), $\tau$ is a time constant and $I_{th}$ is a conventional thermal current of the emulated bimetallic strip, and by means of the relationship:

$$E_{th\_off} = \frac{I_P^2}{I_{th}^2} \times e^{\frac{-t}{\tau}}$$

where $E_{th\_off}$ is the value of the present thermal state when the emulating device (EMU) is not supplied with the line current ($I_P$),
where $I_P$ is the value representative of the line current ($I_P$) at the instant at which the emulating device (EMU) is no longer supplied with current, $\tau$ is a time constant and $I_{th}$ is a conventional thermal current of the emulated bimetallic strip.

9. The emulating device as claimed in claim 8, comprising a counter configured to determine the time (t) since the instant at which the emulating device (EMU) is no longer supplied with current.

10. The emulating device as claimed in claim 8, the programmable digital component being of FPGA type.

11. A protective device (PRO) for protecting an electrical line (LIG) from overcurrents of the line current (Ip), wherein the protective device (PRO) comprises:
   the emulating device (EMU) of claim 8;
   a state comparator (COMP2) configured to compare the cumulative thermal state ($E_{th\_n}$) with a target value ($E_{th\_cible}$); and
   a changeover device (COM) configured to disconnect the electrical line (LIG) if the cumulative thermal state ($E_{th\_n}$) exceeds the target value.

* * * * *